US009277835B1

(12) United States Patent
Jindal

(10) Patent No.: US 9,277,835 B1
(45) Date of Patent: Mar. 8, 2016

(54) CHAIR-BACK MOUNTABLE GARMENT HANGER

(71) Applicant: Rohit Jindal, Alexandria, VA (US)

(72) Inventor: Rohit Jindal, Alexandria, VA (US)

( * ) Notice: Subject to any disclaimer, the term of this patent is extended or adjusted under 35 U.S.C. 154(b) by 0 days.

(21) Appl. No.: 14/698,043

(22) Filed: Apr. 28, 2015

(51) Int. Cl.
*A47G 25/38* (2006.01)
*A47G 25/28* (2006.01)
*B60R 7/04* (2006.01)
*A47G 25/14* (2006.01)
*A47C 7/62* (2006.01)

(52) U.S. Cl.
CPC .............. *A47G 25/14* (2013.01); *A47G 25/28* (2013.01); *A47G 25/38* (2013.01); *B60R 7/043* (2013.01); *A47C 7/62* (2013.01)

(58) Field of Classification Search
CPC .............. A47G 25/06; A47G 25/0514; A47G 25/0607; A47G 25/14; A47G 25/28; A47G 25/38; A41D 27/22; A47C 7/62; A47F 7/19; B60R 7/04; B60R 7/043; B60R 7/08
USPC ...................................................... 223/88, 90
See application file for complete search history.

(56) References Cited

U.S. PATENT DOCUMENTS

| 846,911 | A | | 3/1907 | Crump | |
| 1,696,128 | A | * | 12/1928 | Shee | 211/123 |
| 1,722,122 | A | * | 7/1929 | Wilson | 211/106 |
| 2,255,973 | A | | 9/1941 | Hoobler | |
| 2,431,196 | A | | 11/1947 | Pascoo | |
| 2,692,688 | A | | 10/1954 | Callais | |
| 2,734,638 | A | * | 2/1956 | Feldman | 211/119.007 |
| 2,840,241 | A | | 6/1958 | Callais | |
| 4,957,230 | A | | 9/1990 | Gonzales | |
| 5,058,790 | A | * | 10/1991 | LaVelle | 224/275 |
| 5,383,588 | A | * | 1/1995 | Kazel | 224/275 |
| 5,718,026 | A | | 2/1998 | Harrison et al. | |
| D441,202 | S | | 5/2001 | Richter | |
| 6,808,093 | B1 | | 10/2004 | Lin et al. | |

FOREIGN PATENT DOCUMENTS

GB 356958 A * 9/1931

* cited by examiner

*Primary Examiner* — Ismael Izaguirre
(74) *Attorney, Agent, or Firm* — Bacon & Thomas, PLLC

(57) ABSTRACT

A chair-back mountable garment hanger has a main supporting body; at least one fastening element configured to attach the supporting body to a seat back, and a hanger element supported by the supporting body. In one configuration, the main supporting body has a pair laterally extending wings, and a back adapted to lie against a back surface of a seat back. Mounting hooks are coupled to respective laterally extending wings, and are configured to be hooked over the seat back to thereby hang the main supporting body from the seat back. A hanger element, formed of a single piece of wire, defines a pair of garment shoulder support portions and a pair of downwardly extending support members which slidably engage with, and extend from a top edge of, the main support body, whereby the hanger element is vertically adjustable relative to the main support body.

18 Claims, 5 Drawing Sheets

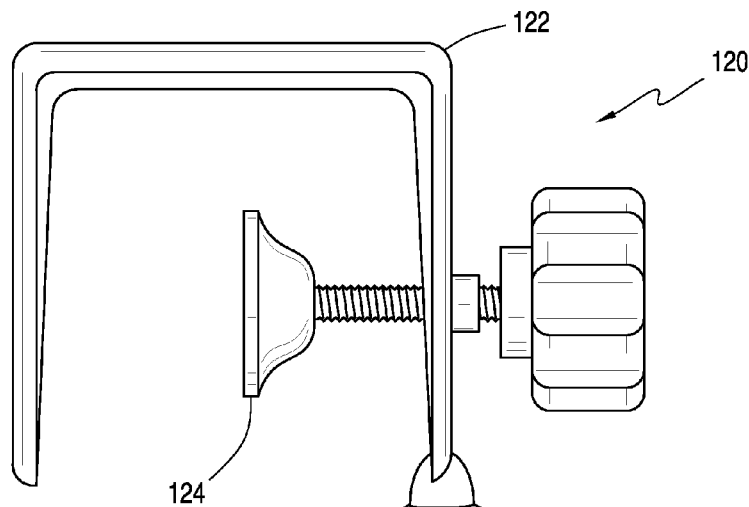
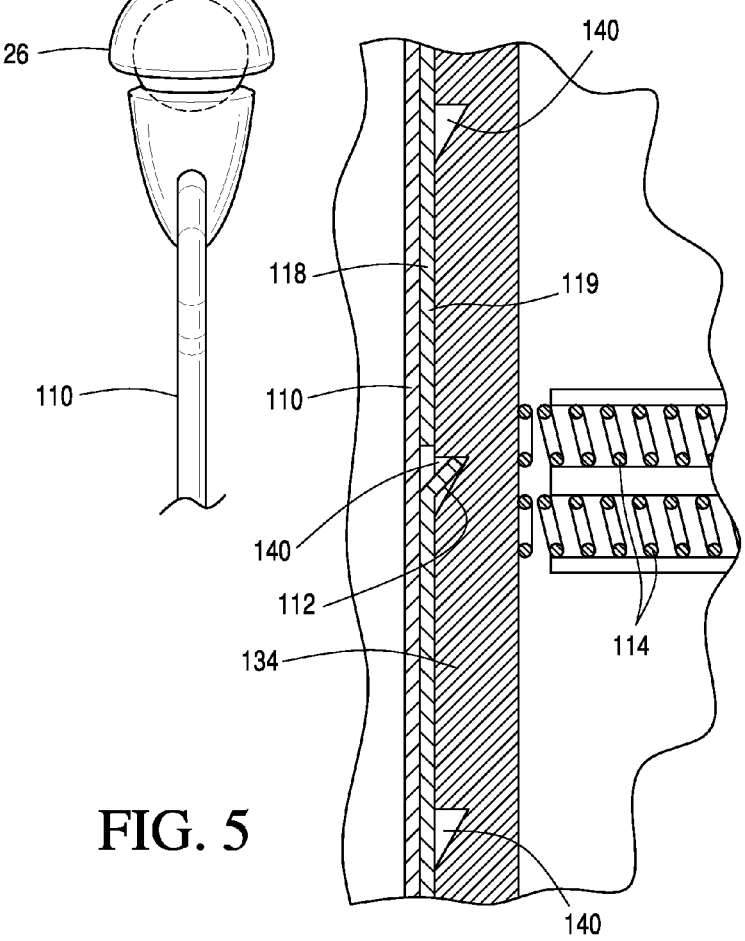
FIG. 6
FIG. 5

CHAIR-BACK MOUNTABLE GARMENT HANGER

FIELD OF THE INVENTION

The present invention relates to a garment hanger, and more particularly to a chair-back mountable garment hanger configured to be removably mounted to the back of a chair.

BACKGROUND

It is common in a workplace that professional employees and others arrive at an office space formally or semi-formally dressed with a suit or sport jacket or the like, or seasonally with an outer garment such as an overcoat. Typically an outer garment is removed by the wearer upon entry into the office space, and often the jacket is removed for the wearers comfort upon arrival at a personal desk. In particular regarding suit or sport jacket or the like, the jacket may be simply draped over the back of the wearer's office chair, so that the jacket may be readily accessed as needed.

While common, the practice of draping a garment over a seat back is disadvantageous, versus hanging the garment in a closet, using a conventional coat hanger, in that the garment may become wrinkled or suffer undue wear as the wearer leans against parts of the garment draped over the chair.

It is therefore desirable to provide a garment hanger accessory, which can be easily attached or removed from a seat back, and in particular a seat back of an office desk chair or the like, which avoids damage, wrinkling and undue wear of a garment.

SUMMARY

According to one aspect of the present invention, a chair-back mountable garment hanger is provided, comprising: a main supporting body having a pair of opposite, laterally extending wings; at least one fastening element disposed on said main supporting body, the fastening element being configured to attach to a seat back with said main supporting body suspended therefrom; and a hanger element supported by said main supporting body.

In one embodiment, the hanger element comprises a pair of laterally extending garment shoulder supports.

In another embodiment, the hanger element further comprises at least one downwardly extending support member, the support member being engaged with the main support body.

In another embodiment, the support member is slidably engaged with the main supporting body whereby the hanger element is adjustable in a vertical position relative to the main support body.

In another embodiment, the at least one fastening element comprises a hook configured to be hooked over the seat back.

In another embodiment, the at least one fastening element comprise a clamp configured to secure the hook to the seat back.

In another embodiment, the at least one fastening element is coupled to the main supporting body by a flexible coupling.

In another embodiment, the at least one flexible coupling comprises a pivotable coupling.

In another embodiment, the at least one flexible coupling comprises a ball and socket type coupling.

In another embodiment, the at least one fastening element comprises a pair of fastening elements.

In another embodiment, each of said pair of fastening elements is disposed at a respective one of said laterally extending wings of said main supporting body.

In another embodiment, the support member comprises a plurality of latching elements, the latching elements being configured to be selectively engaged with the main supporting body to define a plurality of lockable vertical positions of the hanger element relative to the main supporting body.

In another embodiment, the latching elements are notches formed in the support member.

In another embodiment, the chair-back garment hanger further comprises a biasing element configured to bias the support member into a releasably latched engagement with the main supporting body.

In another embodiment, the biasing element comprises at least one spring.

In another embodiment, the clamp comprises a screw clamp.

In another embodiment, the main supporting body has a front and a back, and the back is arranged to lie against a back surface of the seat back when the chair-back garment hanger is mounted to the seat back.

In another embodiment, the main supporting body comprises a receptacle, and the support member is slidably received in the receptacle of the main supporting body.

In another embodiment, the hanger element is formed of a single piece of wire, and the at least one downwardly extending support member comprises a pair of downwardly extending support members each being defined by an end portion of the single piece of wire.

These and other features, aspects, and advantages of the present invention will become better understood with regard to the following description, appended claims, and accompanying drawings.

BRIEF DESCRIPTION OF THE DRAWINGS

FIG. 5 is a partial section view along section 5-5 of FIG. 4, showing biasing elements and latching elements in greater detail.

FIG. 6 is a side view of an embodiment of a fastening element of the chair-back mountable garment hanger.

DETAILED DESCRIPTION OF VARIOUS EMBODIMENTS

Figure 1:
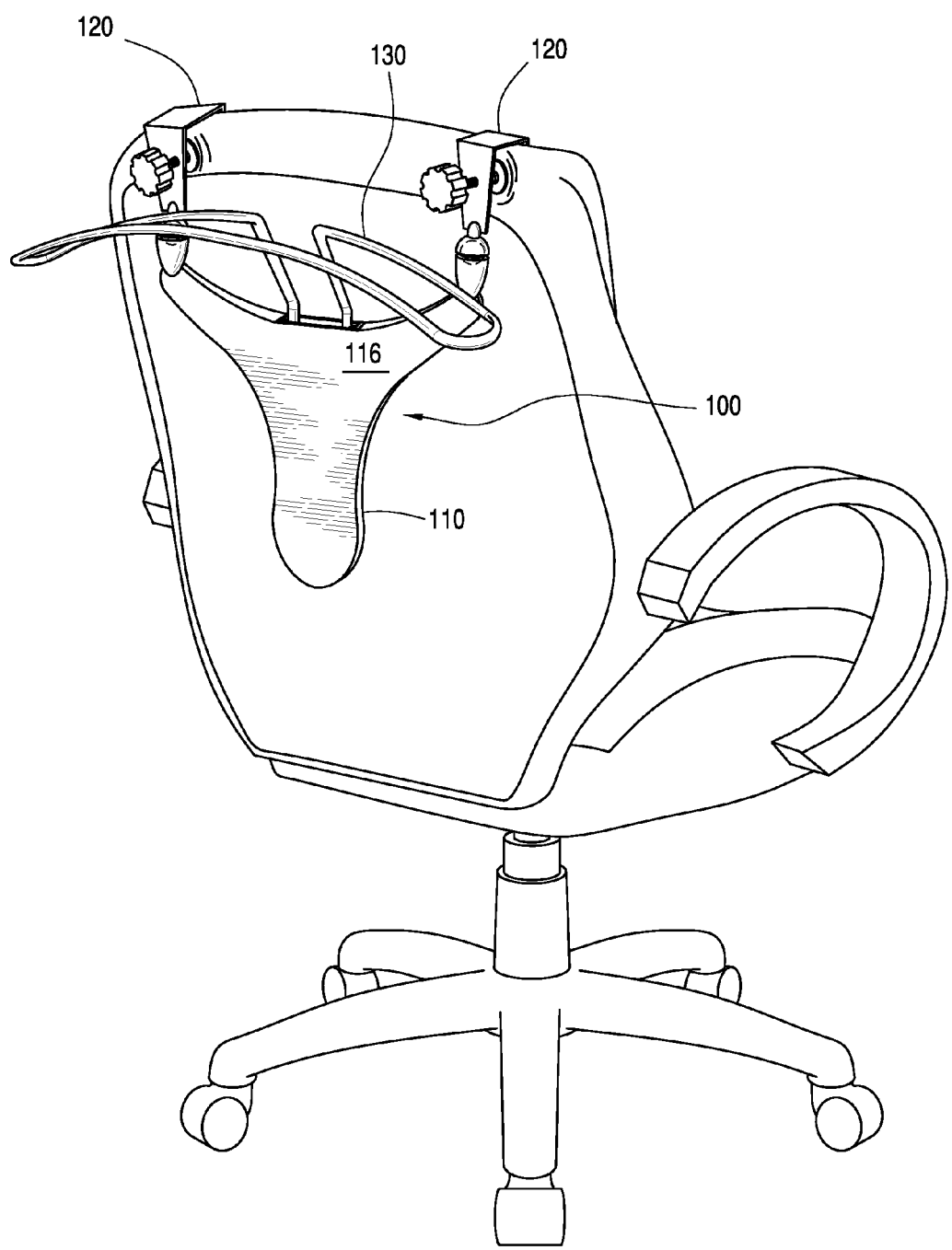
FIG. 1 is an embodiment of a chair-back mountable garment hanger of according to the present invention.

Referring to FIG. 1, chair-back mountable garment hanger 100 comprises, broadly speaking, a main supporting body 110, at least one fastening element 120 disposed on the main supporting body 110, the fastening element 120 being configured to attach to a seat back with the main supporting body 110 suspended therefrom, a hanger element 130 supported by the main supporting body 110.

Figure 2:
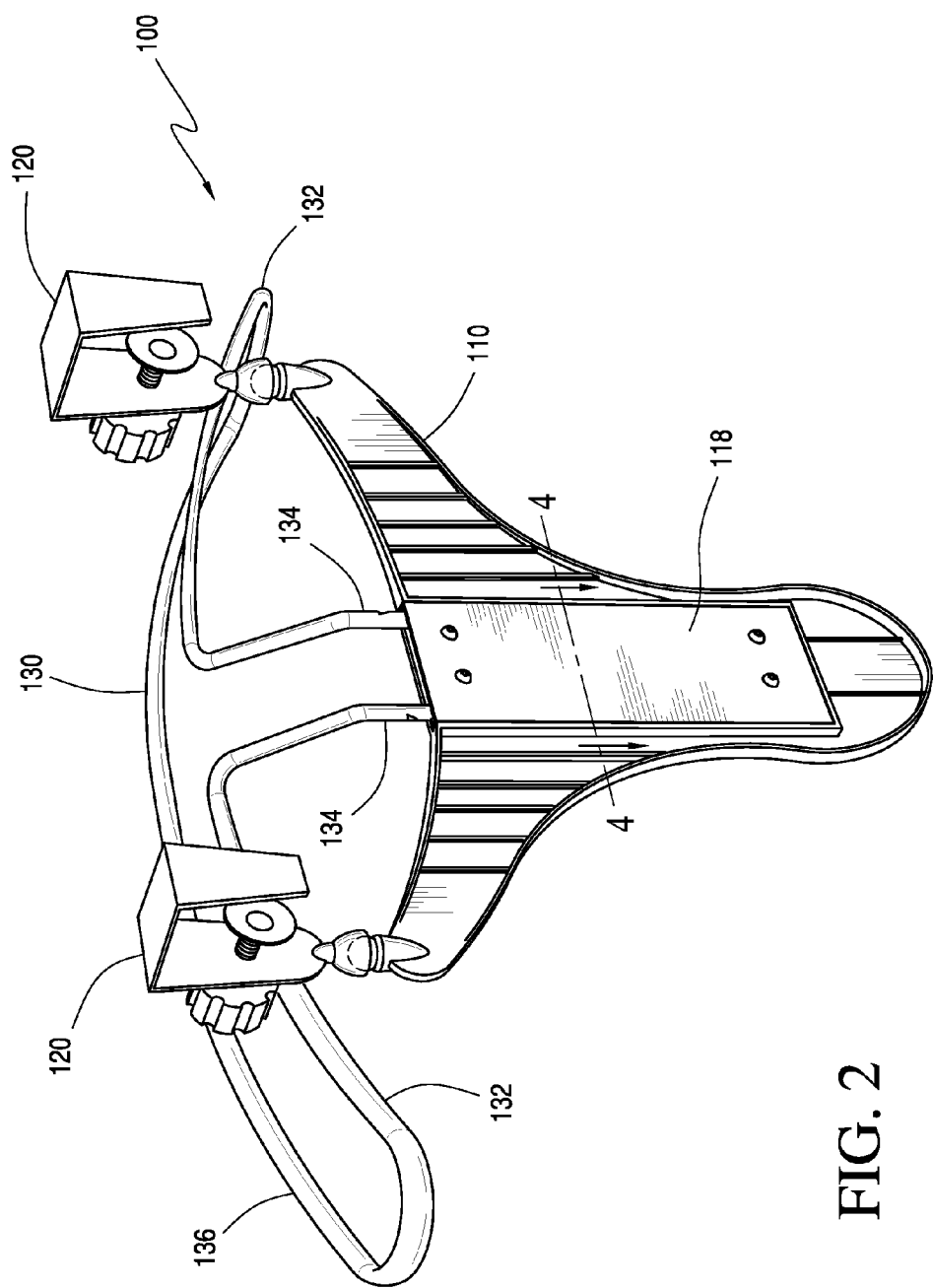
FIG. 2 is a rear perspective view of an embodiment of a chair-back mountable garment hanger of according to the present invention.

In the embodiment of FIGS. 1 and 2, the hanger element 130 comprises a pair of laterally extending garment shoulder supports 132, arranged to support a garment, such as a jacket or coat, by the garment's shoulders in a generally conventional manner. The hanger element 130 may be differently configured to support other or additional types of garments or other objects.

As noted above, hanger element 130 is supported by the main supporting body 110. Preferably, the hanger element 130 is coupled to the main supporting body 110 in a manner allowing for vertically adjustable positioning of the hanger element 130 relative to the main supporting body 110, when the chair-back mountable garment hanger 100 is mounted onto a chair or seat back.

In the illustrated embodiment, the hanger element 130 comprises at least one downwardly extending support member 134, wherein the support member 134 is engaged with the main supporting body 110. More particularly, in the illustrated embodiment, at least one downwardly extending support member 134 of the hanger element 130 comprises a pair of downwardly extending support members 134 which are slidably engaged with the main supporting body 110 whereby the hanger element 130 is adjustable in a vertical position relative to the main supporting body 110.

In the illustrated embodiment, the hanger element 130 is formed of a single piece of wire 136, wherein the support members 134 are each defined by an end portion 138 of said single piece of wire 136. In this embodiment, the laterally extending garment shoulder supports 132 are elongated U-shaped sections of the wire 136, and may have a downward curvature toward their ends to approximate a typical shoulder profile to support a garment without undue deformation, or an unnatural fitting of the garment onto the shoulder supports 132. The hanger element 130 may be alternatively formed, such as from wood, plastic or another material. For example, wooden dowels may be used to form shoulder supports, or the entire hanger element formed of plastic such as an injection molded plastic or the like. In certain embodiments, a covering such as a leather, plastic, rubber, fabric or other covering may be provided on all or portions of the hanger element, such as a covering over the shoulder supports 132 to further protect a garment hung on the hanger element 130.

Figure 3:
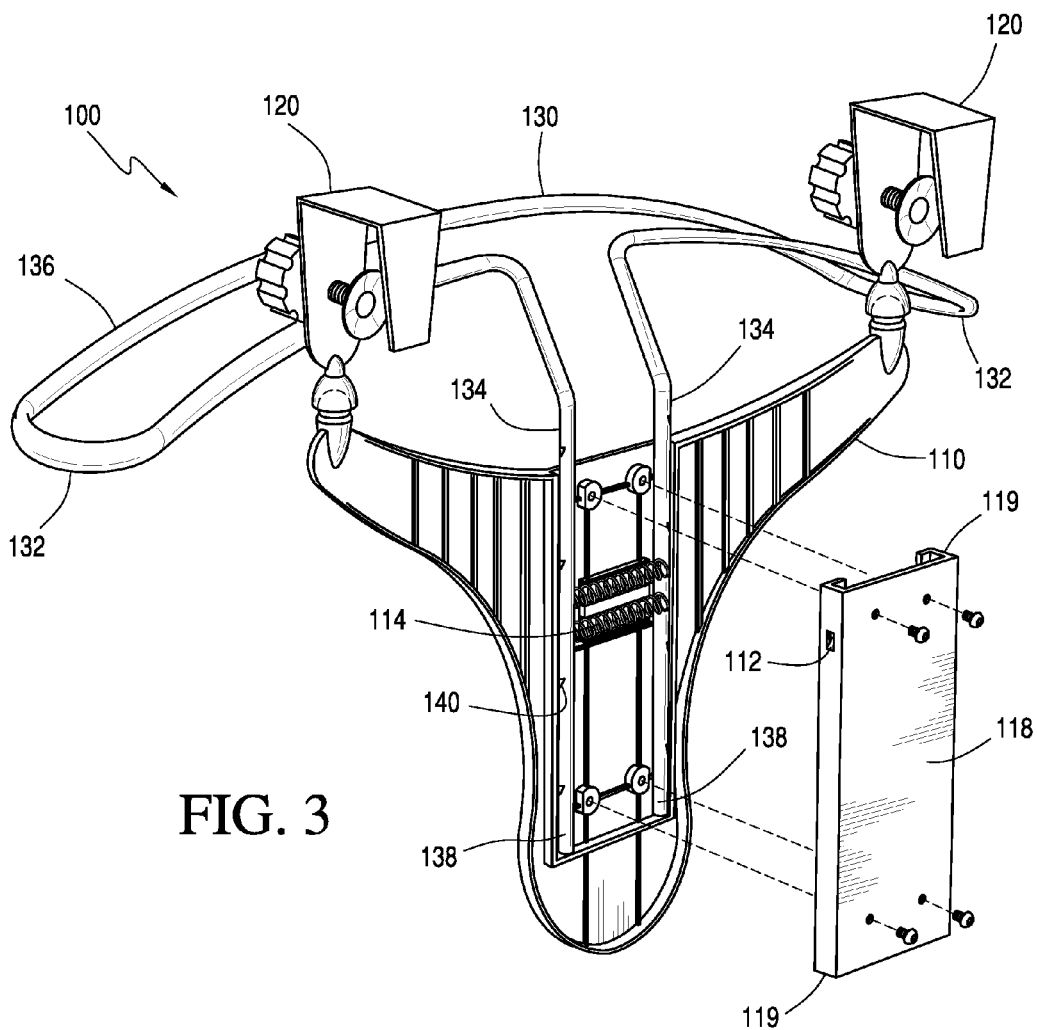
FIG. 3 is an exploded rear perspective view of an embodiment of a chair-back mountable garment hanger of according to the present invention, showing a manner of attaching a hanger element to a main supporting body of the embodiment.
Figure 4:
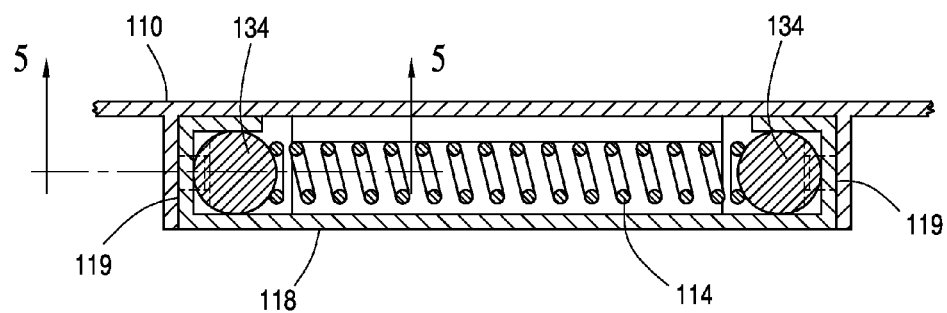
FIG. 4 is a cross-section view along section 4-4 of FIG. 2, showing an arrangement of biasing elements and latching elements providing for latchable positional adjustment of the hanger element.

Referring to FIGS. 3-5, elements of an embodiment of a mechanism attaching the hanger element 130 to the main supporting body 110 are shown in greater detail, including elements providing for vertical position adjustment of the hanger element 130. In this embodiment, the support members 134 comprise a plurality of latching elements which are configured to be selectively engaged with the main supporting body 110 to define a plurality of lockable vertical positions of the hanger element relative to the main supporting body 110. More particularly, in the embodiment shown, the latching elements 140 are notches formed in the support members 134 which may be selectively engaged with a latching protrusion 112 formed or disposed on the main supporting body 110. The latching elements 140 are spaced apart lengthwise along the support members 134 to define lockable vertical positions of the hanger element 130 relative to the main supporting body 110.

Referring in particular to FIG. 5, a rear cover 118 is provided to form a part of the mounting assembly of the hanger element 130, wherein the support members 134 are retained in a receptacle defined within a space between the back of the main supporting body 110 and the rear cover 118. In this embodiment, the latching protrusions 112 are formed in side walls 119 of the rear cover 118, as tabs or the like extending inward to engage with the latching elements 140 of the support members 134.

A biasing element 114 is configured to bias the support members 134 into a releasably latched engagement with the latching protrusion 112 of the main supporting body 110. In the illustrated embodiment, the notches are formed in outward facing side of at least one of the support members 134, whereby the support members 134 can be released from their latching engagement with the main supporting body 110 by squeezing the support members 134 together against the bias, to disengage the notches from the latching protrusion 112 to allow sliding of the support members 134 into another position. The biasing element 114 may comprise an arrangement of at least one spring, or another type of resilient or compressive element.

Figure 7:
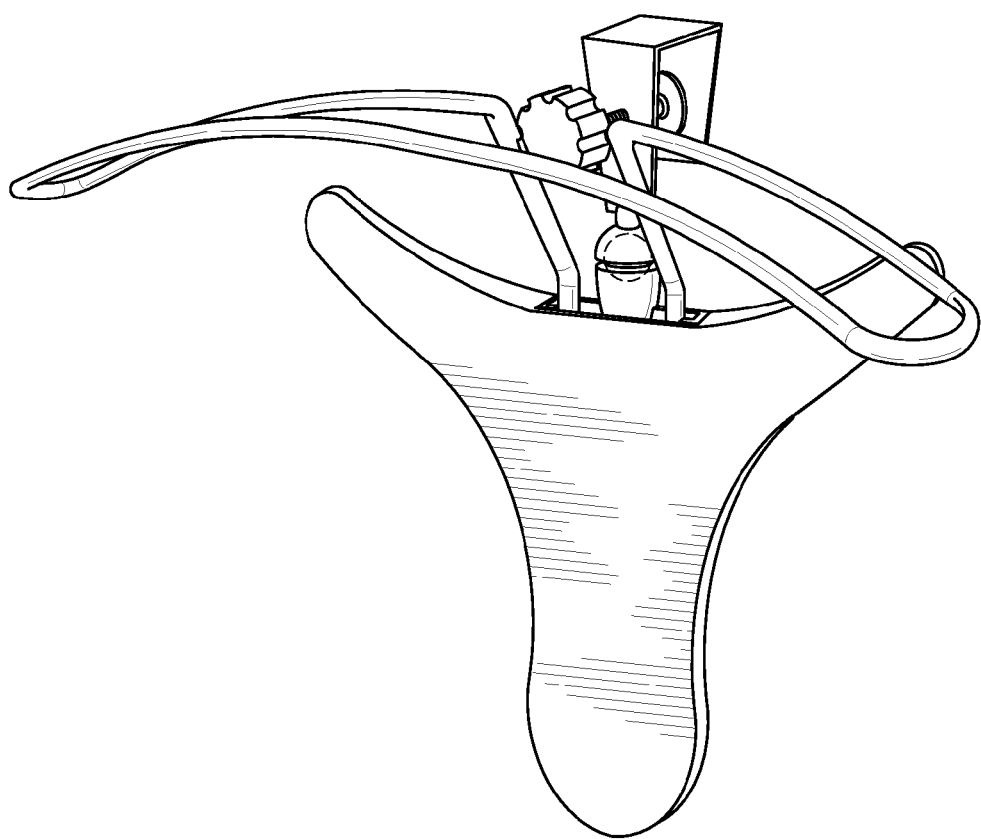
FIG. 7 illustrates another embodiment of a chair-back mountable garment hanger of according to the present invention, showing an alternative arrangement of fastening elements.

The at least one fastening element 120 may comprise a single fastening element 120 (see for example FIG. 7), or a plurality of fastening elements 120 (see for example FIGS. 1-3). Turning to FIG. 6, an illustrated embodiment of the at least one fastening element 120 comprises a hook 122 configured to be hooked over the seat back. A single hook 122 may be provided, for example a centrally disposed hook 122 of sufficient width for stable support. Alternatively, and preferably, a pair of hooks 122 are disposed on the main support body, such as outwardly on outward extending wings of the main support body.

The fastening element 120 may further comprise a clamp 124 configured to secure the fastening element 120 to said seat back. In the illustrated embodiment, the fastening element 120 comprises a hook 122 in combination with a clamp 124. It can be recognized that the fastening elements 120 may be of varied dimension, to accommodate mounting to seat backs of varied dimension. In this regard, in addition to simply securing or clamping the fastening elements 120 to a seat back, the clamp 124 can be seen as providing a degree of adjustment to fit seat backs of differing widths.

The fastening element 120 may be coupled to the main supporting body 110 by a flexible coupling 126, allowing the main supporting body 110 and the hanger element 130 supported thereby to swing freely with respect to the seat back, allowing a garment suspended on the hanger element 130 to hang naturally despite variations or changes in an angle of tilt of the seat back. For example, a tilt or recline of a seat back may vary from one chair to another. And, the tilt or recline of a seat back may be varied according to user preference or habit in chairs with a reclining back or rocking feature. The flexible coupling 126 may comprise a pivotable coupling, such as ball and socket coupling.

The main supporting body 110 itself, in the illustrated embodiment, is a generally flat body having a front side 116 and a back side, wherein the main supporting body 110 is configured so that the back side lies against a back surface of a seat back when the chair-back garment hanger is mounted to the seat back. Preferably, the main supporting body 110 has a sufficient width to distribute any load against the seat back over a sufficient area to avoid creating pressure points against the seat back, which may cause undue wear of the seat back, or undue user discomfort.

It will be understood that the above-described embodiments of the invention are illustrative in nature, and that modifications thereof may occur to those skilled in the art. Accordingly, this invention is not to be regarded as limited to the embodiments disclosed herein, but is to be limited only as defined in the appended claims.

I claim:

1. A chair-back mountable garment hanger, comprising:
   a main supporting body having a pair of opposite, laterally extending wings, a front surface and a back, the back being adapted to lie against a back surface of a seat back when the chair-back mountable garment hanger is mounted to a seat back;
   a pair of mounting hooks, each mounting hook being coupled to a respective one of said laterally extending wings by a flexible coupling joint, the flexible coupling joint providing free angular pivoting movement about at least two axes; and
   a hanger element, the hanger element comprising a pair of opposite laterally extending garment shoulder support portions and a pair of downwardly extending support members, wherein the hanger element is formed of a single piece of wire, and wherein the pair of downwardly extending support members are defined by opposite end portions of said single piece of wire;
   wherein said support members are slidably engaged with, and extend from a top edge of, said main support body, whereby said hanger element is adjustable in a vertical position relative to said main support body; and
   wherein each of said mounting hooks is configured to be hooked over said seat back such that said main supporting body is suspended to hang in a freely swinging manner from the seat back.

2. The chair-back mountable garment hanger according to claim 1, wherein said at least one of said support members comprises a plurality of latching elements disposed lengthwise along the at least one of said support members, the latching elements being configured to be selectively engaged with said main supporting body to define a plurality of lockable vertical positions of said hanger element relative to said main supporting body.

3. The chair-back mountable garment hanger according to claim 2, wherein said latching elements are notches formed in said support member.

4. The chair-back garment hanger of claim 2, further comprising a biasing element configured to bias said support member into a releasably latched engagement with said main supporting body.

5. The chair-back garment hanger of claim 4, wherein said biasing element comprises at least one spring.

6. The chair-back garment hanger of claim 2, wherein said main supporting body defines a receptacle, wherein said support members are slidably received in said receptacle and wherein at least one latching protrusion is formed in said receptacle and configured to selectively engage with said latching elements.

7. The chair-back garment hanger of claim 6, wherein said receptacle includes a removable cover.

8. The chair-back garment hanger of claim 7, wherein said latching protrusion is formed in said removable cover.

9. The chair-back garment hanger of claim 1, wherein said main supporting body defines a receptacle, wherein said support members are slidably received in said receptacle.

10. The chair-back garment hanger of claim 1, wherein each of said mounting hooks comprises a clamping element to clamp said hooks to said seat back.

11. The chair-back garment hanger of claim 10, wherein said clamp comprises a screw clamp.

12. A chair-back mountable garment hanger, comprising:
    a main supporting body having a pair of opposite, laterally extending wings, a front surface and a back, the back being adapted to lie against a back surface of a seat back when the chair-back mountable garment hanger is mounted to a seat back;
    a receptacle defined in said main supporting body;
    a pair of mounting hooks, each mounting hook being coupled to a respective one of said laterally extending wings by a flexible coupling joint, each of said mounting hooks being configured to be hooked over said seat back to thereby hang said main supporting body from said seat back; and
    a hanger element, the hanger element comprising a pair of opposite laterally extending garment shoulder support portions and a pair of downwardly extending support members, wherein the hanger element is formed of a single piece of wire, and wherein the pair of downwardly extending support members are defined by opposite end portions of said single piece of wire;
    wherein said support members are slidably engaged in the receptacle of said main support body, whereby said hanger element is adjustable in a vertical position relative to said main support body;
    wherein said at least one of said support members comprises a plurality of latching elements disposed lengthwise along the at least one of said support members, the latching elements being configured to be selectively engaged with said main supporting body to define a plurality of lockable vertical positions of said hanger element relative to said main supporting body;
    wherein a biasing element is disposed in said receptacle and arranged to bias said support member into a releasably latched engagement with said main supporting body.

13. The chair-back mountable garment hanger according to claim 12, wherein at least one latching protrusion is formed in said receptacle and configured to selectively engage with said latching elements.

14. The chair-back garment hanger of claim 12, wherein said receptacle includes a removable cover.

15. The chair-back garment hanger of claim 14, wherein said receptacle includes a removable cover and said latching protrusion is formed in said removable cover.

16. The chair-back mountable garment hanger according to claim 12, wherein at least one cooperative latching element is formed in said receptacle and configured to cooperatively and selectively engage with said latching elements.

17. The chair-back garment hanger according to claim 16, wherein said at least one cooperative latching element is a protrusion, and said latching elements are notches.

18. The chair-back mountable garment hanger according to claim 12, wherein said flexible coupling joint provides free pivoting movement about at least two axes.

\* \* \* \* \*